March 10, 1936. O. S. JENNINGS Re. 19,887

PANEL CIRCUIT BREAKER

Original Filed April 20, 1929 2 Sheets-Sheet 1

INVENTOR
Oliver S. Jennings.
BY
Merle G. Barr
ATTORNEY

March 10, 1936. O. S. JENNINGS Re. 19,887

PANEL CIRCUIT BREAKER

Original Filed April 20, 1929 2 Sheets-Sheet 2

INVENTOR
Oliver S. Jennings.
BY
Oberlight & Barr
ATTORNEY

Reissued Mar. 10, 1936 Re. 19,887

UNITED STATES PATENT OFFICE 19,887

PANEL CIRCUIT BREAKER

Oliver S. Jennings, Mansfield, Ohio, assignor to Westinghouse Electric & Manufacturing Company, a corporation of Pennsylvania Original No. 1,872,296, dated August 16, 1932, Serial No. 356,647, April 20, 1929. Application for reissue April 12, 1934, Serial No. 720,326

9 Claims. (Cl. 247—10)

Figure 1:
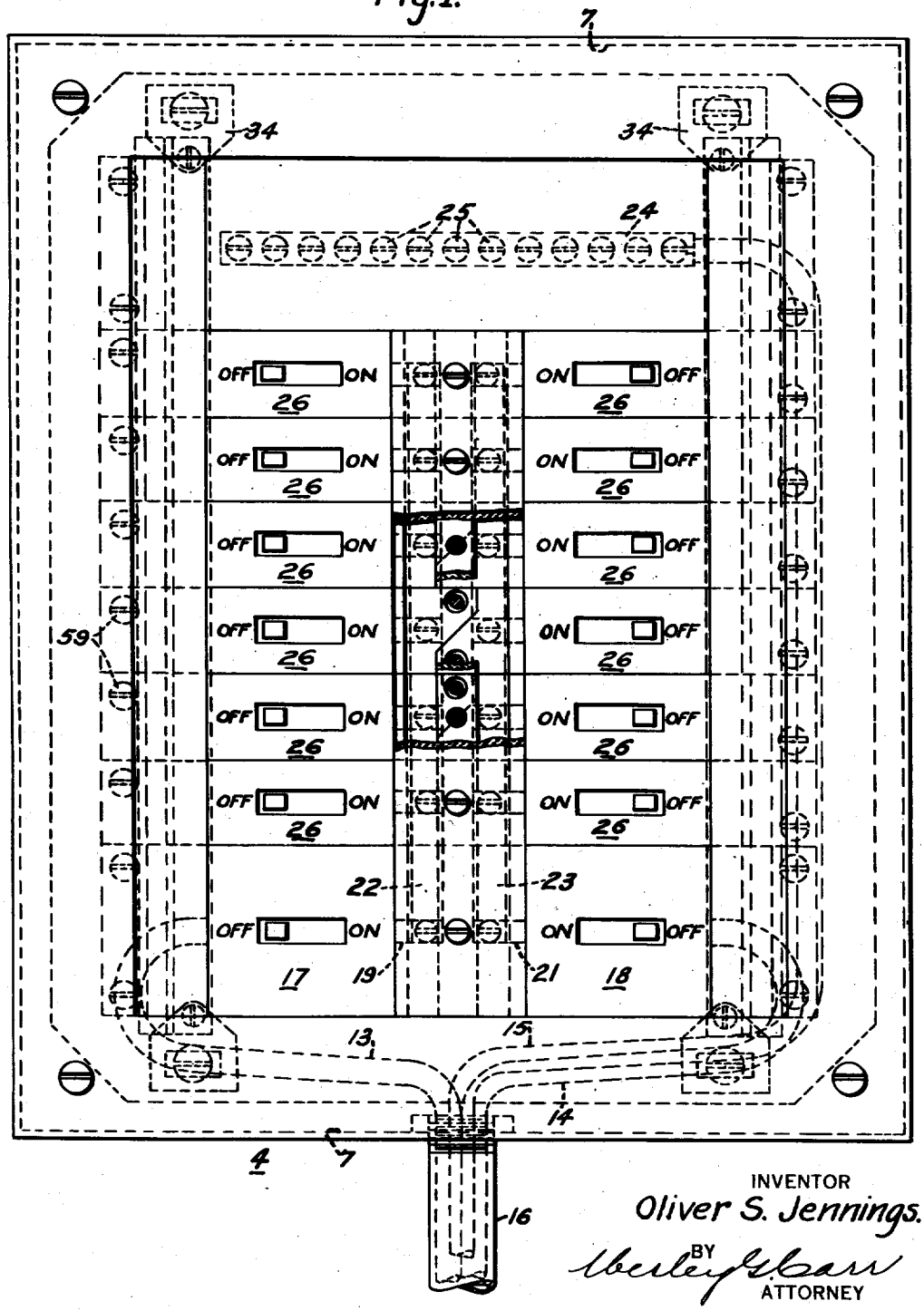

My invention relates to distributing panel boards and particularly to circuit breaker panel boards wherein the branch and main line circuits are controlled by automatic circuit breakers adapted to open the circuit when severe overload and short circuit conditions occur.

Heretofore it has been the custom to provide the branch line circuits with a switch and a fuse whereby the branch line circuit may be disconnected from the feeder conductors by means of a switch, usually of the tumbler type, or by means of a fuse in the event that a short circuit occurs in the circuit in which the fuse is connected. When a fuse has been broken, it is usually necessary to have it replaced by an agent of the central station supplying the power or by an authorized agent of the apartment house or factory in which the panel board is installed. Considerable delay and inconvenience is frequently encountered in having the fuses replaced.

An object of my invention is to provide a panelboard arrangement wherein the main circuit and the branch circuits are controlled by automatic circuit breakers instead of the usual switch and fuse and wherein the operating handles for the circuit breakers are accessible to occupants of the building in which the panel board is installed, and whereby the service can be immediately restored by simply reclosing the circuit breaker, after it has been opened by an abnormal current condition.

A further object of my invention is to provide a circuit breaker panel board wherein ample venting facilities are provided for permitting the gases generated by the operation of the circuit breaker under abnormal current conditions, the venting system comprising a centrally disposed channel or flue into which the circuit breakers discharge the arc gases, the flue also serving to provide ventilation and a circulation of air past the circuit breaker units, thereby maintaining them at proper operating temperatures.

A further object of my invention is to provide a circuit breaker panel board, having the above noted characteristics, wherein the enclosures for the circuit breakers are fastened to the bases for supporting the circuit breakers by a means constituting a seal accessible from the exterior of the enclosure, but which is covered by the panelboard housing cover in such manner that they are inaccessible so long as the cover is in operative position. Unauthorized tampering with the circuit breaker units is thus precluded, for in order to obtain access to the circuit breaker mechanism, it is necessary to remove the housing cover and the enclosure for the circuit breaker after breaking the seal.

A further object of my invention is to provide a circuit breaker panel, wherein the circuit breaker units are assembled upon a frame structure within the housing and wherein each separate unit may be removed from the housing without disturbing the others, thereby rendering replacement of the circuit breaker units when desired without interrupting the service controlled by the remaining circuit breakers.

A further object of my invention is to provide a circuit breaker panel board that is compact and readily accessible and which requires less space than the usual panel board employing switches and fuses.

Figure 2:
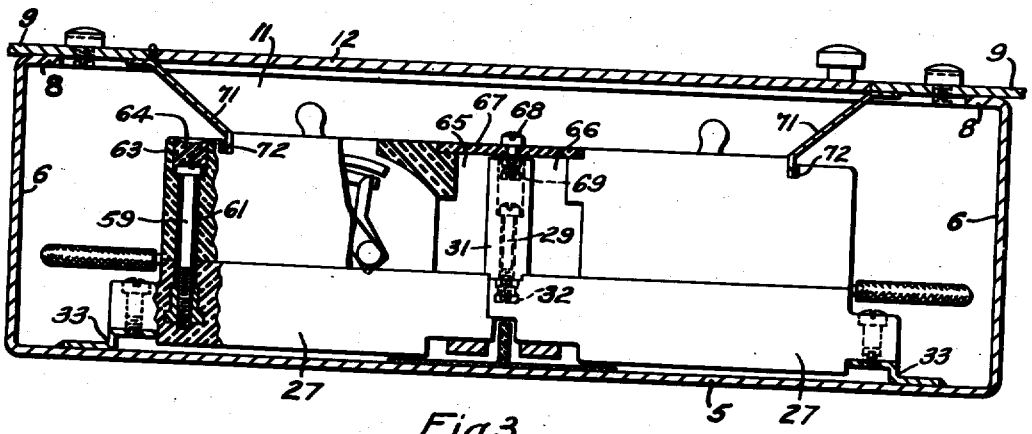
Figure 3:
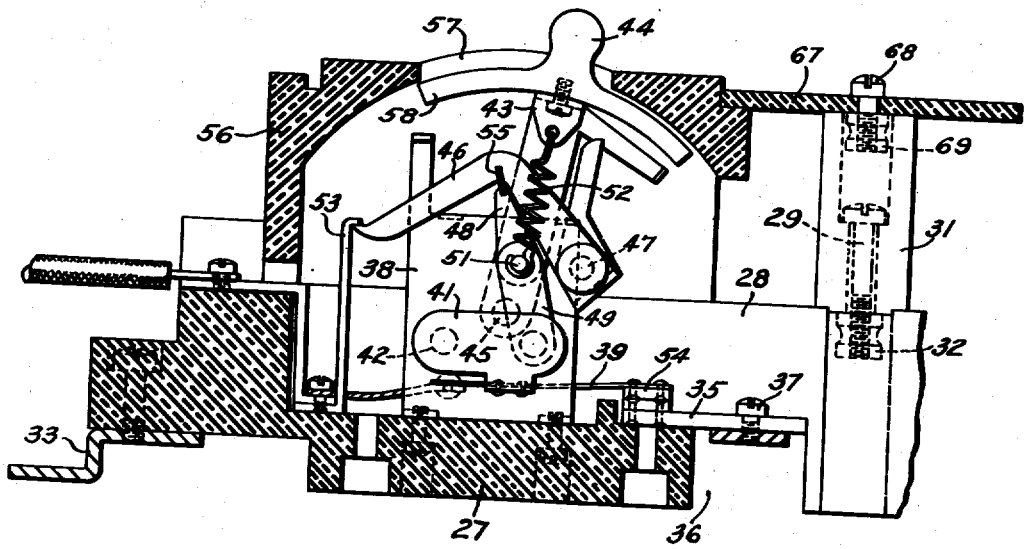

These and other objects that will be made apparent throughout the further description of my invention are attained by means of the apparatus hereinafter described and illustrated in the accompanying drawings, wherein, Figure 1 is a plan view of a circuit breaker panel board with the door removed for the purpose of disclosing the interior structure, Fig. 2 is a transverse section through the panel board shown in Fig. 1, disclosing the circuit breaker units in elevation, and partially in section, and Fig. 3 is a transverse section through a circuit breaker unit showing the circuit breaker in elevation.

Referring to the drawings, the circuit-breaker panel board comprising a metal housing 4 having a bottom wall 5, side walls 6 and end walls 7, the side and end walls being provided with an inwardly extending flange 8, to which the cover or trim 9 is detachably secured by any preferred means. The cover or trim 9 is provided with an opening 11 through which the panel board circuit breakers are accessible, the opening 11 being closed by a door 12, that is hinged to the trim 9.

The feed conductors 13, 14 and 15 of a three wire current supply system enter the lower end of the housing 4 from the conduit 16, the conductors 13 and 14 being connected to the main circuit breakers 17 and 18 having terminals 19 and 21 respectively, connected to bus bars 22 and 23 respectively, while the conductor 15 is connected to a neutral bus bar 24 mounted in the upper portion of the housing as indicated in Figure 1 and which is provided with a plurality of branch line binding posts 25, to which the return conductors of each branch line circuit are connected.

A branch line circuit breaker 26 is provided for each branch line circuit, the circuits being arranged in pairs and the circuit breakers thereof being connected to separate feed conductors 22 and 23. Where more than two branch line circuits are provided, the circuit breakers 26 are arranged in pairs in side by side relation and constitute two vertical rows of circuit breakers, as indicated in Figure 1. While the branch line circuit breaker 26 is herein illustrated as of the single-pole type, it will be evident that multipole circuit breakers might be similarly employed when the desired external circuit connections make such desirable.

For the purpose of illustration, a complete circuit breaker unit is described in detail by reference to Figures 2 and 3. Each pair of circuit breakers are mounted upon an insulating base 27 that may be made in one piece, or in two interchangeable blocks, as illustrated in the drawings. Each base block 27 comprises a block of insulating material having a recess 28 in which the circuit breaker to be hereinafter described is mounted The blocks constituting a complete insulating base unit are identical in construction and are interchangeable, the adjacent ends being made to overlap, as indicated in Figure 1, and the blocks are tied to one another by means of screws 29, that extend through an insulating barrier block 31 into metal threaded inserts 32.

The barriers 31 serve a triple purpose; joining the insulating base blocks 27, dividing the space between the circuit breaker enclosures to be hereinafter described, and supporting a cover for the space in the manner to be hereinafter described.

The base blocks 27, after being connected to one another, may be assembled upon Z-bars 33 which serve to connect a plurality of base blocks in side by side relation, as indicated in Figures 1 and 2. Upon completion of the entire circuit breaker assembly, the assembly may be placed in the housing 4 as a unit, by securing the Z-bars 33 to the bottom of the housing in the usual manner by means of adjustable clamps 34.

The circuit breaker employed may be of any preferred construction, and for the purpose of illustration, I have shown a circuit breaker of the type disclosed in my copending application, Serial No. 356,646, filed April 20, 1929, now Patent No. 1,794,901, and assigned to the Westinghouse Electric and Manufacturing Company. Since no claim is specifically made to the form of circuit breaker, a brief description only will be given as indicating the character of the operation.

A contact terminal 35 is mounted in the recess 28 of the base 27 and is connected to the bus bar 19 which extends through a recess 36 in the base 27, by means of screws 37. A metal frame 38 is mounted upon the base 27 and supports a flexible switch arm 39 that is attached to an arm 41 that is pivotally mounted on the pivot shaft 42 carried by the frame 38. The operating lever 43 provided with an insulating handle 44, is pivotally mounted for rotation upon a shaft 45 also carried on the frame 38. A toggle carrier 46 of inverted V-shape is pivotally mounted upon the pivot shaft 47 carried upon the frame 38 and serves to support a link 48 of a toggle that is pivotally connected to the switch arm through the medium of a second toggle link 49, the toggle links being pivotally connected by a knee pivot shaft 51, to which a spring 52 is connected at one end, the other end of the spring being connected to the operating lever 43.

The toggle carrier 46 is releasably retained in operative position by a bimetal thermostat latch 53 that is carried in the branch line circuit and which bends toward the left when heated and which releases the toggle carrier 46 when a severe overload or short circuit occurs. It will be noted that when the circuit breaker is in the position indicated in Figure 3, the switch arm 39 carrying the contact 54 is retained in closed position by the straight position of the toggle links 48 and 49. Movement of the operating handle 44 to the left moves the upper end of the spring 52 over a center line between the knee pivot 51 and the point 55 at which the toggle link 48 engages the toggle carrier 46. This movement causes the toggle links to collapse and the spring 52 then causes the switch arm 37 to be moved to open position with a snap action. Normal manual operation of the circuit breaker is accomplished by moving the operating handle 44 to the right or to the left as the case may require.

When the toggle carrier 46 is released by reason of the movement of the bimetal thermostat latch 53, the spring 52 contracts and causes clockwise rotation of the toggle carrier 46 which permits the switch arm 39 to move to the open position with a snap action, thereby interrupting the circuit in response to an abnormal current condition.

An insulating cover 56 is provided for enclosing the circuit breaker apparatus and this cover is provided with an opening 60 adjacent the circuit breaker contact 54, through which the gases generated by the arc incident to separation of the circuit breaker contacts escape.

The cover 56 is provided with a slot 57 through which the operating handle 44 extends and the handle is provided with arcuate extensions 58 which serve to cover the slot 57 and prevent access to the mechanism beneath the cover through the slot 57 and prevents the escape of arc gases through the slot.

The cover 56 is attached to the base 27 by means of a screw 59 that extends through an opening 61 in the cover into a threaded metal insert 62 embedded in the insulating block 27. The opening 61 is enlarged at 63 to receive the head of the screw and to also receive a sealing compound 64, such as sealing wax. By reason of this construction, in order to gain access to the circuit breaker mechanism, it is first necessary to break the sealing wax and remove the screw 59.

Referring to the drawings, it will be noted that when the covers 56 are in assembled position upon the base blocks 27 to constitute a circuit breaker unit, a space is provided between the covers 56 that is divided by barriers 31 mounted on each base unit 27, thus dividing the space into two separate flues or conduits 65 and 66, the former communicating with all of the openings 60 in the covers 56 mounted on the left side of the barriers 31 and the conduits 66 communicating with the openings 60 of the covers mounted on the right side of the barriers 31. The conduits 65 and 66 are closed by a cover plate 67 that engages the outer faces of the covers 56 and is secured in place by screws 68 that are threaded into insert 69 in the barrier blocks 31.

The gases discharged through the openings 60 in the covers, enter the conduits 65 and 66, and are conducted vertically to the upper end of the housing, and sufficiently cooled that they can do no damage to the apparatus within the housing. The conduits also serve as a ventilating means for the circuit breaker housings, permitting heated air arising from the circuit breaker contacts during service, to escape into the conduits where it is conducted to the upper end of the housing. By reason of these convection currents, cool air drawn in at the bottom of the housing is circulated through and around the circuit breaker units, thereby maintaining them at a safe and efficient operating temperature.

By reference to Figures 1 and 2, it will be noted that the cover or trim 9 of the housing is provided with inwardly projecting metal flanges 71 that terminates in grooves 72 provided in the upper faces of the covers 56, and it will be observed that the seals which fasten the cover to the base blocks lie behind and beneath the flanges 71 which render the seals inaccessible so long as the cover 9 is in assembled position.

It will be understood that access to the circuit breaker operating handles 44 may be had through the opening 11 in the cover 9 and that the cover 9 is in no case removed execept by authorized agents of the central station supplying the current to the panel board. Since the seals are rendered inaccessible to unauthorized persons, the covers for the circuit breakers cannot be removed without improper tampering with the panel board and because the circuit breakers are sealed in place, the manufacturers can guarantee the circuit breaker apparatus so long as the seal of the cover is not broken.

It will be understood that the main circuit breakers are similar in construction to the branch line circuit breakers, except that the capacity thereof is greater and they are of larger and heavier construction.

It will be seen from the foregoing that I have provided a simple and compact automatic circuit breaker panel board assembly that is capable of expansion to accommodate any desired number of branch line circuits and that a panel board construction has been provided wherein proper ventilation is afforded and wherein the circuit breakers are rendered tamper-proof.

While I have illustrated but one embodiment of my invention, it will be apparent to those skilled in the art that various changes, modifications, substitutions, additions and omissions may be made in the apparatus illustrated without departing from the spirit and scope of my invention as set forth in the appended claims.

I claim as my invention:

1. A circuit breaker panel comprising two spaced rows of enclosed circuit breaker units disposed side-by-side in each row and having the adjacent ends of the enclosure provided with openings communicating with the space between the rows and a closure for the space between the rows constituting a conduit for conducting arc gases discharged from the said openings.

2. A circuit breaker panel comprising two spaced rows of circuit breakers disposed side-by-side in each row and each unit having an enclosure for surrounding it provided with an opening for the escape of gases communicating with the space between the rows, a closure for the space between the rows cooperating with the enclosure to constitute a conduit for conducting arc gases discharged from the said openings, and a barrier extending longitudinally of the conduit dividing it into two passages, each for receiving the gases from the enclosures of separate rows of circuit breaker units.

3. A circuit breaker panel comprising a plurality of panel units arranged side-by-side and each comprising a pair of cooperating interchangeable insulating bases, a circuit breaker on each base having arc drawing contacts disposed near the adjacent ends of the bases, an enclosure for surrounding each circuit breaker and mounted upon the said bases and having their adjacent ends spaced apart and provided with openings for the discharge of arc gases, and a cover closing the space therebetween cooperating with the enclosures for constituting with the enclosures a conduit for receiving gases from said openings.

4. A circuit breaker panel comprising a housing, a plurality of circuit breaker units within the housing, each comprising a base, a circuit breaker mounted thereon, an enclosure for the circuit breaker and means for attaching the enclosure to the base constituting a seal accessible from the exterior of the enclosure, an operating handle for the circuit breaker accessible from the exterior of the enclosure, a cover for the housing having an opening therein through which the operating handles are accessible, and covering the said seal and preventing access thereto so long as the cover is in position on the housing.

5. A circuit breaker panel comprising two spaced rows of separate circuit breaker units, the units of each row being disposed side-by-side and each constituting a separate chamber having a vent opening into the space between the said rows, and a circuit breaker within the chamber having its contacts adjacent the vent, a cover for the space between the rows cooperating with the units and constituting therewith a closed common conduit into which arc gases are discharged from the circuit breaker units.

6. A panel-board comprising a plurality of circuit breaker units disposed in side-by-side relation in a substantially vertical row, each unit having an enclosure provided with an opening for the discharge of arc gases from the arc drawing contacts of the circuit breaker, and means including a continuous barrier disposed opposite the said openings and cooperating with said units to form a substantially vertically extending flue for conducting the discharged gases from the circuit breaker units.

7. A circuit breaker panel comprising a housing, a plurality of circuit breaker units within the housing, each comprising a base, a circuit breaker mounted thereon, an enclosure for the circuit breaker and means for attaching the enclosure to the base, an operating handle for the circuit breaker accessible from the exterior of the enclosure, and means for covering said attaching means and preventing access thereto so long as the cover means is in position.

8. A panel-board comprising two spaced rows of circuit breaker units disposed in side-by-side relation in substantially vertical alinement, each unit having an enclosure provided with an opening for the discharge of arc gases from the arc drawing contacts of the circuit breaker, and means including a continuous barrier disposed between said rows of circuit breaker units and cooperating therewith to form a pair of substantially vertically extending flues for conducting the discharge gases from the circuit breaker units.

9. A panel-board comprising a plurality of circuit breaker units disposed in side-by-side relation in a substantially vertical row, each unit having an enclosure provided with an opening for the discharge of arc gases from the arc drawing contacts of the circuit breaker, means including a continuous barrier disposed opposite the said openings and cooperating with said units to form a substantially vertically extending passage, and a cover plate for said passage, thereby constituting a flue for conducting the discharged gases from the circuit breaker units.

OLIVER S. JENNINGS.